United States Patent [19]

Suzuki

[11] Patent Number: 5,459,580
[45] Date of Patent: Oct. 17, 1995

[54] RECORDING APPARATUS FOR INFORMING AN OPERATOR OF AN INCONSISTENCY BETWEEN THE KIND OF SHEET DESIGNATED BY THE OPERATOR ON WHICH RECORDING IS DESIRED TO OCCUR AND THE KIND OF SHEET ACTUALLY SET IN THE RECORDING APPARATUS

[75] Inventor: Yasuhito Suzuki, Kawasaki, Japan

[73] Assignee: Canon Kabushiki Kaisha, Tokyo, Japan

[21] Appl. No.: 97,101

[22] Filed: Jul. 27, 1993

Related U.S. Application Data

[63] Continuation of Ser. No. 899,039, Jun. 16, 1992, abandoned, which is a continuation of Ser. No. 630,490, Dec. 20, 1990, abandoned.

[30] Foreign Application Priority Data

Dec. 21, 1989 [JP] Japan .................................. 1-329585

[51] Int. Cl.$^6$ ........................ G03G 15/00; B41J 13/00; H04N 1/00
[52] U.S. Cl. ...................... 358/296; 347/139; 355/311; 395/111

[58] Field of Search ...................... 355/206–207, 355/309, 311; 346/134; 395/111; 271/9; 400/605; 358/296; 347/139, 153, 264

[56] References Cited

U.S. PATENT DOCUMENTS

| 4,763,889 | 8/1988 | Del et al. ........................... 271/9 |
| 4,791,447 | 12/1988 | Jacobs ............................. 355/290 |
| 4,809,050 | 2/1989 | Ito .................................. 355/243 |
| 4,974,019 | 11/1990 | Nishioka et al. ................ 355/206 |
| 4,985,736 | 1/1991 | Kawano et al. ................. 355/311 |
| 5,004,928 | 4/1991 | Suzuki et al. .................... 250/559 |
| 5,019,916 | 5/1991 | Ogura ............................. 358/401 |
| 5,029,833 | 7/1991 | Tani et al. ......................... 271/9 |
| 5,129,639 | 7/1992 | DeHority ..................... 355/311 X |
| 5,130,757 | 7/1992 | Ito .................................. 355/311 |

*Primary Examiner*—Joan H. Pendegrass
*Attorney, Agent, or Firm*—Fitzpatrick, Cella, Harper & Scinto

[57] ABSTRACT

A recording apparatus capable of changing the kind of sheet on which printing occurs, includes a discrimination circuit for discriminating the kind of sheet on which printing is to occur specified in input data, and a memory for storing data representing the kind of sheet set in the apparatus. A control circuit then controls the apparatus based on outputs from the discrimination circuit and the memory.

46 Claims, 4 Drawing Sheets

RECORDING APPARATUS FOR INFORMING AN OPERATOR OF AN INCONSISTENCY BETWEEN THE KIND OF SHEET DESIGNATED BY THE OPERATOR ON WHICH RECORDING IS DESIRED TO OCCUR AND THE KIND OF SHEET ACTUALLY SET IN THE RECORDING APPARATUS

This application is a continuation of application Ser. No. 07/899,039, filed on Jun. 16, 1992, now abandoned, which is a continuation of application Ser. No. 07/630,490, filed Dec. 20, 1990, now abandoned.

BACKGROUND OF THE INVENTION

1. Field of the Invention

This invention relates to a recording apparatus, and more specifically to a recording apparatus which can use various kinds of recording sheets.

2. Related Background Art

Known recording apparatus use sheets of a plurality of sizes as recording media. For example, copying machines have been developed which permit an operator to select or exchange copying sheets in accordance with the size of an original to be copied. Such known copying machines can have plural sheet feeding units, storing copy sheets of different sizes. These machines select a copy sheet of a certain size to be fed through the machine based on the size of an original which is sensed by a sensor or based on a desired enlargement/reduction factor. As another example, known page printers permit an operator to exchange sheets or select a feeding unit storing a sheet of a designated size according to a sheet size designation accompanying printing data. However, these known recording apparatus control only the size of the recording medium. As a result, such recording apparatus cannot respond to a request for the use of various kinds of sheets for recording. Such sheets include, for example, perforated paper, pre-printed paper on which a prescribed form is printed, multi-hole paper, color paper, and paper having an adhesive backing. Thus, data to be printed on plain paper may be printed on pre-printed paper when an operator who inputs printing data does not observe the recording apparatus.

SUMMARY OF THE INVENTION

Accordingly, it is an object of the present invention to provide a recording apparatus that can overcome the problems described above.

It is another object of the present invention to provide a recording apparatus that can execute an appropriate recording operation on different kinds of paper.

It is still another object of the present invention to provide a recording apparatus that can prevent the unnecessary consumption of recording sheets.

It is still another object of the present invention to provide a recording apparatus that performs a proper operation without being affected by the kind of a recording sheet used.

It is still another object of the present invention to provide a recording apparatus that can prevent an unnecessary charge to an operator for printing performed on the wrong paper.

In accordance with one aspect, the present invention which achieves these objectives relates to a recording apparatus comprising discrimination means for discriminating the kind of sheet on which recording is to occur specified in input data inputted into the apparatus, a memory for storing data representing the kind the sheet set in the apparatus, and control means for controlling the apparatus based on the outputs of the discrimination means and the memory. The apparatus can further comprise informing means for informing an operator of the kind of sheets specified in the input data when the kind sheets specified is different from the kind of sheet set in the apparatus. The apparatus can also comprise size discrimination means for discriminating the size of the sheet on which recording is to occur specified in the input data, and a detector for detecting the size of the sheet set in the apparatus. The control means controls the apparatus based on the outputs from the size discrimination means and the detector. The apparatus can further comprise input means for inputting the input data. The input data can include a command sent from an external device. The apparatus can also include a printing mechanism for printing an image in accordance with the input data. The discrimination means discriminates the kind of sheet specified based on the command input by the input means and can comprise a memory for storing the data representing the kind of sheets specified.

According to another aspect, the present invention relates to a recording apparatus comprising a first memory for storing data representing the kind of sheet on which recording is to occur as specified by input data inputted into the apparatus, a second memory for storing data representing the kind of sheet set in the apparatus, and informing means for informing an operator of an inconsistency between the data stored in the first and second memories. The apparatus can further comprise a third memory for storing data representing the size of the sheet specified by the input data, and a detector for detecting the size of the sheet set in the apparatus. The informing means informs an operator of an inconsistency between the data stored in the third memory and the size of the sheet detected by the detector. The apparatus also comprises input means for inputting the input data, where the input data includes a command sent from an external device, and a printing mechanism for printing an image in accordance with the input data. The printing mechanism can comprise first and second sheet feeding mechanisms. The recording apparatus can further comprise changing means for changing the sheet feeding mechanism which feeds a sheet to the printing mechanism when data stored in the first and second memories are inconsistent.

Other objects, features, and advantages of the invention will become apparent from the following detailed description of the preferred embodiment of the present invention and the accompanying drawings.

DETAILED DESCRIPTION OF THE PREFERRED EMBODIMENT

The preferred embodiments of the present invention will be described in detail herein with reference to the accompanying drawings.

Embodiment 1

Figure 1:
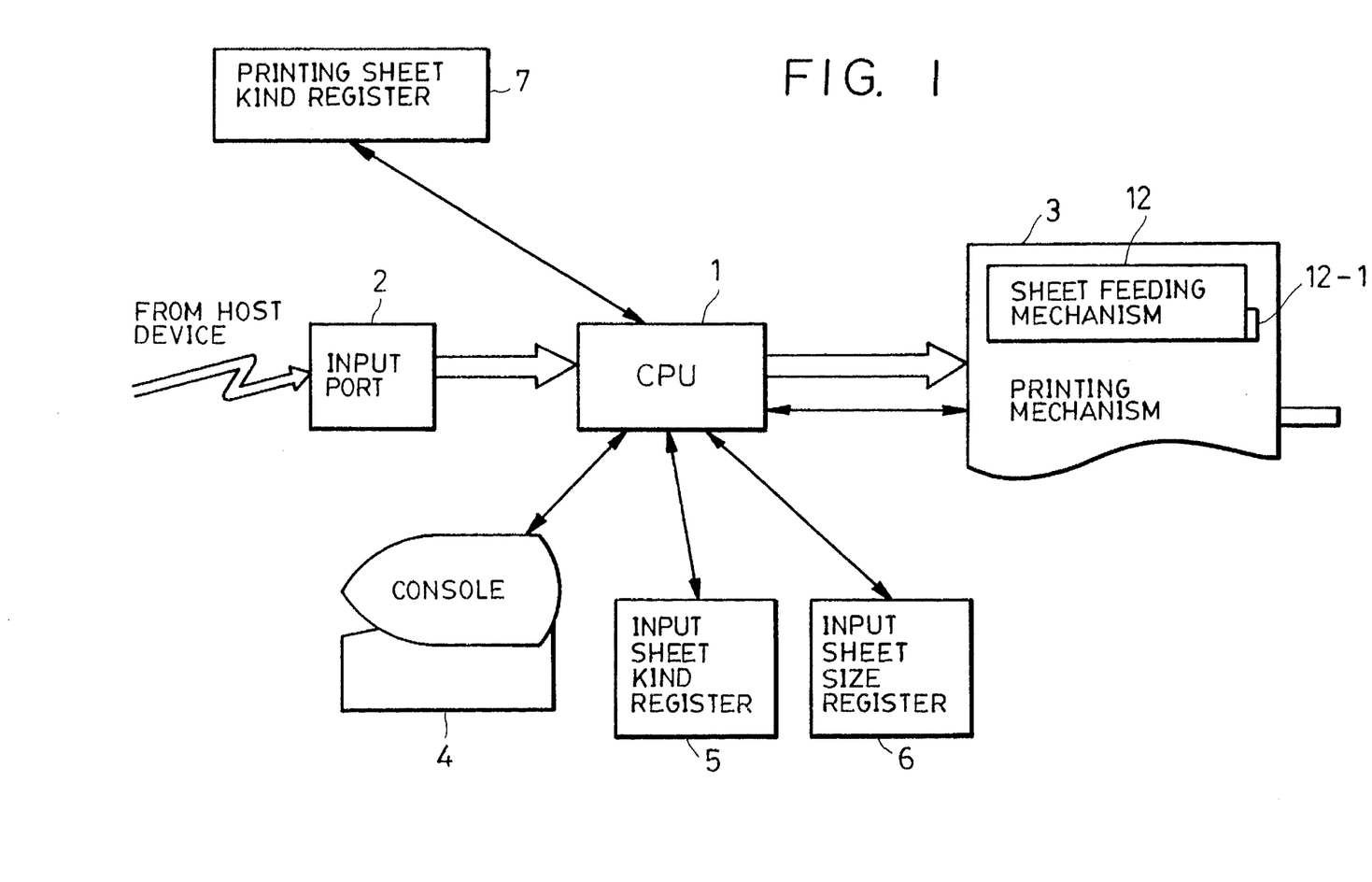
FIG. 1 is a block diagram showing the structure of a recording apparatus according to a first preferred embodiment of the present invention.

FIG. 1 is a block diagram showing the structure of a recording apparatus according to a first embodiment of the present invention. The apparatus shown in FIG. 1 includes a central processing unit (CPU) 1 for controlling the entire printing operation, including image processing, of the recording apparatus, and an input port 2 for receiving input data sent from a host device (not shown) and for providing the CPU 1 with received input data.

A printing mechanism 3 includes a sheet feeding mechanism 12, and a detecting means 12-1 for detecting the size of a sheet, which is set in the sheet feeding mechanism 12 as a recording medium. The printing mechanism 12 prints a bit image of input data on a sheet by using a known electrophotographic technology.

A console 4 is provided for displaying a message sent from the recording apparatus for an operator, and for providing the recording apparatus with instructions from an operator. An input sheet kind register 5 is also provided for storing the kind of sheet designated by a sheet designation command, which is included in input data received by the input port 2. An input sheet size register 6 is provided for storing a sheet size designated by the sheet designation command. Also provided is a printing sheet kind register 7 for storing the kind of a sheet set in the sheet feeding mechanism 12 of the printing mechanism 3. The operator inputs data into the printing sheet kind register 7 through console 4 to determine the type of sheet the operator desires to be set by the apparatus. This is done before the CPU 1 compares the contents of the input sheet kind register 5 and the printing sheet kind register 7.

In FIG. 1, the thick arrows show the flow of printing data, and the thin arrows show the flow of control information.

An explanation of a printing procedure according to the first embodiment will now be provided below with reference to a flow chart shown in FIG. 2.

Figure 2:
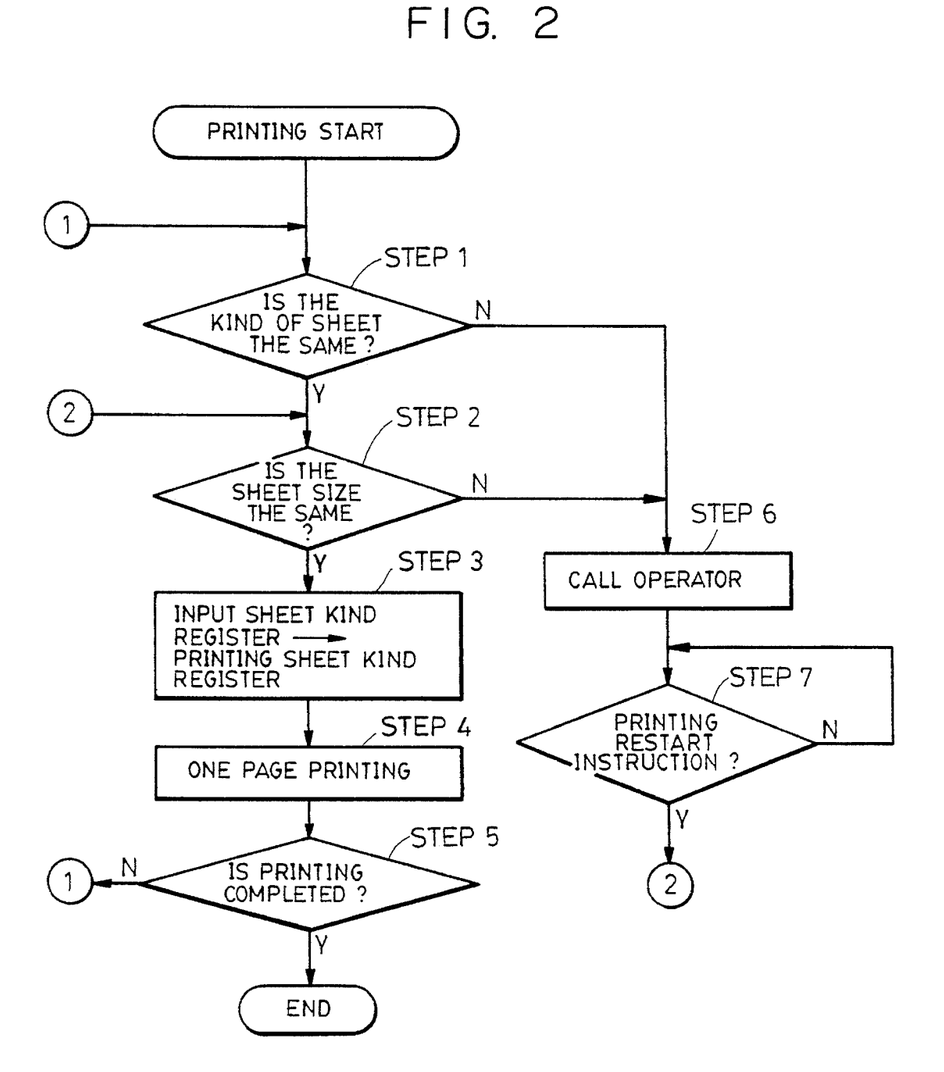
FIG. 2 is a flow chart for explaining a printing control procedure according to the embodiment shown in FIG. 1.

In FIG. 2, steps 1 to 7 denote each procedure, and each procedure is stored in a program memory (not shown).

Before printing, the CPU 1 sets the kind of sheet in the input sheet kind register 5, and the sets the sheet size in the input sheet size register 6, in accordance with a designation by a sheet designation command, which is included in input data sent from the host device (not shown).

In step 1, the CPU 1 compares the contents of the printing sheet kind register 7 with the contents of the input sheet kind register 5, and checks whether the kind of a sheet set in the sheet feeding mechanism 12 is the same as the kind of the sheet designated by the sheet designation command. If it is, the flow advances to step 2, where the CPU 1 compares the sheet size detected by the printing mechanism 3 with the content of the input sheet size register 6, and checks whether the size of the sheet set in the sheet feeding mechanism 12 is the same as the sheet size designated by the sheet designation command. If it is, the flow advances to step 3, where the CPU 1 sets the content of the input sheet kind register 5 in the printing sheet kind register 7. Then, in step 4, the CPU 1 analyzes input data, and causes one page to be printed by the printing mechanism 3.

In step 5, the CPU 1 checks whether the printing of the entire data is completed. When in step 5 the printing is not completed, the flow returns to step 1, where the printing is continued. If the answer in step 5 is yes, the printing is terminated.

If in steps 1 or 2 the answer is no, i.e., when the kind or size of the sheet set in the sheet feeding mechanism 12 are different from the kind or size of the sheet designated by the sheet designation command, the flow advances to step 6.

In step 6, a message for requesting an operator to change the sheet is displayed on the console 4. Then, in step 7, the CPU stands by to wait for a printing restart instruction input by an operator through the console 4. When in step 7 the printing restart instruction is input, the flow returns to step 2, where the CPU 1 checks the size of the sheet set in the sheet feeding mechanism 12 again.

According to the recording apparatus of the first embodiment, in the case where the sheet designated by input data is different from the sheet set in the sheet feeding mechanism 12, this fact is detected in step 1 or step 2 in FIG. 2, so that an operator is called. If the operator sets the designated sheet in the sheet feeding mechanism 12 and inputs the printing restart instruction, the recording apparatus checks only whether the size of the sheet in the apparatus is the same as the designated sheet size in step 2. If the sheet size is the same as designated sheet size, the CPU 1 determines that a correct sheet has been set. Then, in step 3, the CPU 1 renews the content of the printing sheet kind register 7 to execute a printing operation.

It should be noted that the CPU 1 checks only the size of the sheet set in the sheet feeding mechanism 12 after the printing restart instruction is input, and renews the contents of the printing sheet kind register 7 after checking the sheet size. Because there are many kinds of sheets, it is impossible for the printing mechanism to detect every type of sheet. For example, if the printing mechanism could detect multi-holed paper, it may be difficult to detect perforated paper. In addition, even if pre-printed paper could be detected, it would be extremely difficult to discriminate the type of preprinted paper. In addition, printing mechanisms cannot detect paper having an adhesive backing, colored paper, a transparent sheet for an overhead projector, or the like. As a result, the judgment of the operator is always required. The present invention permits the judgment of the operator to be exercised by permitting the operator to determine the type of sheet the operator desires to be set by the apparatus by inputting such data into the sheet kind register 7 through console 4. In addition, when the kind of sheet set in the sheet feeding mechanism 12 is different from the sheet designated by the sheet designation command, a message requesting the operator to change the sheet is displayed on the console 4.

By executing the above-described control, it is possible to prevent paper of different kinds from being printed together when this is not the operator's intention. Further, the apparatus can be adapted to various kinds of sheets.

Embodiment 2

Figure 3:
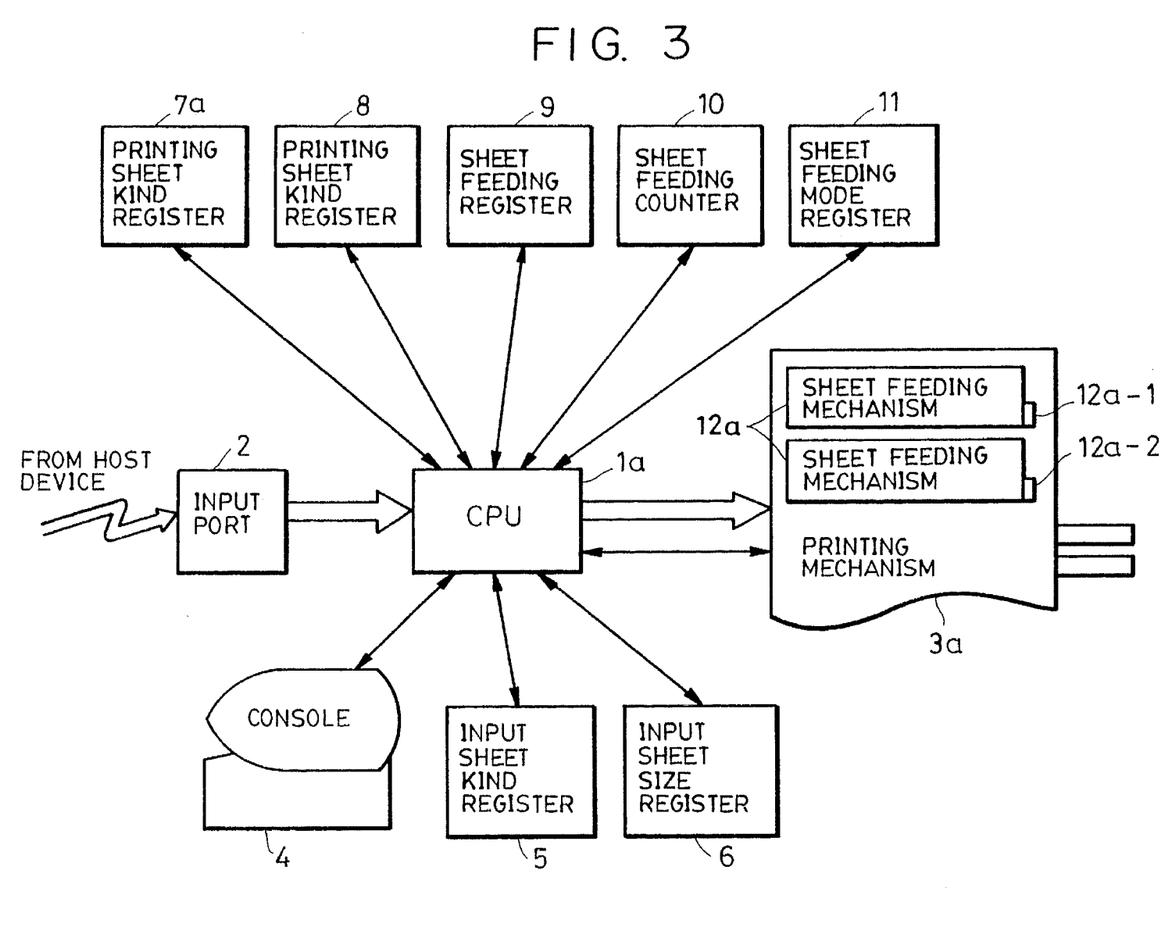
FIG. 3 is a block diagram showing the structure of a recording apparatus according to a second preferred embodiment of the present invention.

FIG. 3 is a block diagram showing the structure of a recording apparatus according to a second embodiment of the present invention.

According to the second embodiment, the printing mechanism 3 shown in FIG. 1 is newly structured as a printing mechanism 3a having two sheet feeding mechanisms I, II (12a), and registers 8, 9, 11 and a counter 10 for controlling each sheet feeding mechanism. In FIG. 3, the same reference numerals are used to denote the corresponding elements shown in FIG. 1.

The apparatus shown in FIG. 3 includes a CPU 1a for conducting the entire printing control, including image processing, of the recording apparatus, and an input port 2 for receiving input data sent from a host device (not shown) and for providing the CPU 1a with the received input data.

The printing mechanism 3a includes the two sheet feeding mechanisms I, II (12a), and detecting means 12a-1, 12a-2 for detecting the size of sheets, which are set in the sheet feeding mechanisms I, II, respectively. The printing mechanism 3a prints a dot image of input data on a sheet.

A console 4 is provided for displaying a message sent from the recording apparatus for an operator, and for providing recording apparatus instructions from an operator. An input sheet kind register 5 is also provided for storing the kind of sheet designated by a sheet designation command, which is included in input data received by the input port 2. An input sheet size register 6 is provided for storing a sheet size designated by the sheet designation command. Also provided are printing sheet kind registers 7a, 8 for storing the kind of sheet set in the sheet feeding mechanisms I, II, respectively. A sheet feeding register 9 is provided for indicting the sheet feeding mechanism which is currently selected in the printing mechanism 3a.

The recording apparatus also includes a sheet feeding counter 10 for counting the number of times the apparatus changes the sheet feeding mechanism which is used and a sheet feeding mode register 11 for storing a sheet feeding mode.

In FIG. 3, the thick arrows show the flow of printing data, and the thin arrows show the flow of control information.

An AUTO mode and a MANUAL mode are included as sheet feeding modes. In the AUTO mode, the sheet feeding mechanisms are changed automatically to use a sheet designated by input data according to the presence of a sheet in the sheet feeding mechanism, the kind of a sheet, the sheet size, or the like. In the MANUAL mode, the sheet feeding mechanism to be used is designated by input data or the console 4.

An explanation of a printing procedure according to the second embodiment will be provided below with reference to a flow chart shown in FIG. 4.

Figure 4:
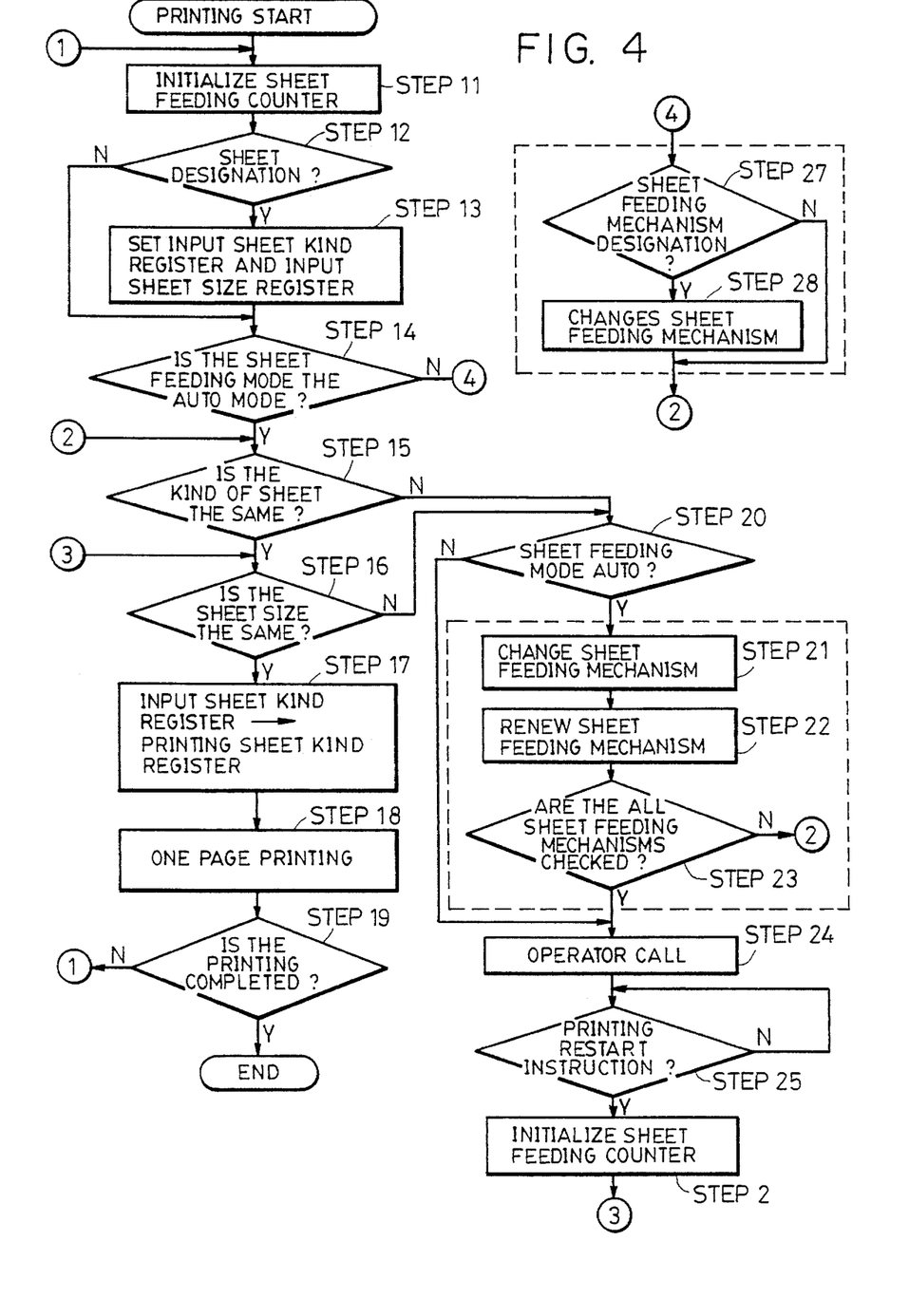
FIG. 4 is a flow chart for explaining a printing control procedure according to the embodiment shown in FIG. 3.

FIG. 4 is a flow chart for showing a series of printing procedures according to the second embodiment. In FIG. 4, steps 11 to 28 denote each procedure to be performed, and each procedure is stored in a program memory (not shown). In FIG. 4, steps for controlling the plural sheet feeding mechanisms are added to the flow chart shown in FIG. 2, whereby steps 15 to 19 in FIG. 4 correspond to steps 1 to 5 in FIG. 2 and steps 24 and 25 in FIG. 4 correspond to steps 6 and 7 in FIG. 2.

Before printing, the CPU 1a sets the kind of sheet in the input sheet kind register 5, and sets the sheet size in the input sheet size register 6, in accordance with a designation by a sheet designation command, which is included in input data sent from the host device (not shown).

In step 11, the CPU 1a initializes the sheet feeding counter 10. Then, in step 12, the CPU 1a checks for the presence of the sheet designation command by analyzing input data. When in step 12 there is no sheet designation command, the flow advances to step 14 by skipping step 13. If in step 12 the answer is yes, the CPU 1a sets the kind of sheet in the input sheet kind register 5, and sets the sheet size in the input sheet size register 6, in accordance with the sheet designation command in step 13.

Then, in step 14, the CPU 1a checks the current sheet feeding mode using the contents of the sheet feeding mode register 11.

If the current sheet feeding mode is the MANUAL mode, the flow advances to steps 27, 28, where sheet feeding mechanism designation/changing processing is performed.

If the current sheet feeding mode is the AUTO mode, the flow advances to step 15 by skipping steps 27, 28.

In step 15, the CPU 1a compares the contents of the printing sheet kind register designated by the sheet feeding register 9 with the contents of the input sheet kind register 5, and checks whether the kind of sheet set in the sheet feeding mechanism currently selected is the same as the kind of the sheet designated by the sheet designation command. If it is, the flow advances to step 16, where the CPU 1a compares the sheet size detected by the sheet feeding mechanism, which is designated by the sheet feeding register 9, with the contents of the input sheet size register 6, and checks whether the size of the sheet set in the sheet feeding mechanism currently selected is the same as the sheet size designated by the sheet designation command. If it is, the flow advances to step 17, where the CPU 1a sets the contents of the input sheet kind register 5 in the printing sheet kind register, which is designated by the sheet feeding register 9. Then, in step 18, the CPU 1a analyzes input data, and causes one page to be printed by the printing mechanism 3a.

In step 19, the CPU 1a checks whether the printing of the entire data is completed. When in step 19 the printing is not completed, the flow returns to step 11, where the printing is continued. If the answer in step 19 is yes, the printing is terminated.

When in steps 15 or 16 the answer is no, i.e., when the kind or size of the sheet set in the sheet feeding mechanism currently selected are different from the kind or size of the sheet designated by the sheet designation command, the flow advances to step 20. In step 20, the CPU 1a checks the current sheet feeding mode using the contents of the sheet feeding mode register 9. If the current sheet feeding mode is the AUTO mode, the flow advances to steps 21 through 23, where sheet feeding mechanism automatic changing processing is performed. If the current sheet feeding mode is the MANUAL mode, the flow advances to step 24 by skipping steps 21 to 23.

In step 21, the CPU 1a renews the sheet feeding mechanism to be selected, i.e., instructs the printing mechanism 3a to change the sheet feeding mechanism, which is used to feed sheets to the printing mechanism 3a and changes the contents of the sheet feeding register 9 so that register 9 stores data representing the other sheet feeding mechanism. Then, in step 22, the CPU 1a adds "1" to the contents of the sheet feeding counter 10. In step 23, the CPU 1a checks whether the contents of the sheet feeding counter 10 has reached the number of the sheet feeding mechanisms, i.e., 2 in this embodiment. If the contents of the sheet feeding counter 10 is less than the number of the sheet feeding mechanisms, the flow advances to step 15, where the CPU 1a checks the kind of sheet set in the other sheet feeding mechanism. If the answer in step 23 is yes, the flow advances to step 24, where a message for requesting an operator to change the sheet is displayed on the console 4.

In step 25, the CPU 1a stands by to wait for a printing restart instruction input by an operator through the console 4. When in step 25 the printing restart instruction is input, the CPU 1a initializes the sheet feeding counter 10 to "0" in step 26. Then the flow returns to step 16, where the CPU 1a checks the size of the sheet set in the former sheet feeding mechanism again.

In sheet feeding mechanism designation/changing processing of step 27, the CPU 1a checks for the presence of a sheet feeding mechanism designation command by analyzing input data. When in step 27 there is the sheet feeding mechanism designation command, the CPU 1a instructs the printing mechanism 3a to designate the sheet feeding mechanism in accordance with the command, and sets the contents of the sheet feeding register 9 according to the command. Then the flow returns to step 15.

According to the second embodiment, specific types of processing are performed in accordance with the sheet feeding modes. In the case where the sheet feeding mode is the AUTO mode, sheet feeding mechanism automatic changing processing is performed in steps 21 to 23. In the case where the sheet feeding mode is the MANUAL mode, sheet feeding mechanism designation/changing processing is performed in steps 27, 28.

According to the second embodiment, the recording apparatus can be adapted to various kinds or sizes of sheets flexibly, and can prevent an undesired sheet from being printed efficiently.

In the above-described embodiment, two sheet feeding mechanisms are provided. However, if printing sheet kind registers corresponding to the number of the sheet feeding mechanisms are provided, any number of sheet feeding mechanisms, greater than one, can be provided.

In the embodiments shown in FIG. 1 and FIG. 3, the console 4 is provided as a display means for displaying a message sent from the recording apparatus for an operator and a means for providing the recording apparatus with instructions from an operator. However, it is not necessary to integrate these means. In addition, the display means can comprise any kind of means, for example, a simple liquid crystal display or an audio synthesis device. Further, a keyboard or one button can be provided as the means for providing the recording apparatus with instruction from an operator.

The individual components represented by the blocks shown in FIGS. 1 and 3 are well known in the recording art and their specific construction and operation is not critical to the operation of the invention or the best mode for carrying out the invention. Moreover, the steps illustrated in FIGS. 2 and 4 can be easily programmed into well known central processing units by persons of ordinary skill, and since such programming per se is not part of this invention, no further description thereof is deemed necessary.

Although the preferred particular embodiments of the present invention are disclosed herein for purposes of explanation, various modifications thereof, after study of this specification, will be apparent to those skilled in the art to which the invention pertains.

What is claimed is:

1. A recording apparatus comprising:

discrimination means for discriminating the kind of sheet on which recording is to occur specified in input data inputted into said apparatus;

a memory for storing data representing the kind of sheet set in said apparatus;

control means for controlling said apparatus based on outputs from said discrimination means and said memory;

informing means for informing an operator of the kind of sheet specified in the input data when the kind of sheet specified is different from the kind of the sheet set in the apparatus;

size discrimination means for discriminating the size of the sheet on which recording is to occur specified in the input data;

means for inputting a printing restart instruction; and means for instructing only the size discrimination means to discriminate the size of the sheet on which recording is to occur after the printing restart instruction is input.

2. A recording apparatus according to claim 1, further comprising:

a detector for detecting the size of the sheet set in said apparatus, wherein said control means controls said apparatus also based on said detector.

3. A recording apparatus according to claim 1, wherein said input means inputs the input data, wherein the input data includes a command sent from an external device; and said printing mechanism prints an image in accordance with the input data.

4. A recording apparatus according to claim 3, wherein said control means discriminates the kind of sheet specified based on the command input by said input means, and comprises a memory for storing data representing the kind of the sheet specified.

5. A recording apparatus comprising:

a first memory for storing data representing the kind of sheet on which recording is to occur as specified by input data inputted into said apparatus;

a second memory for storing data representing the kind of sheet set in said apparatus;

informing means for informing an operator of any inconsistency between the data stored in said first and second memories;

size discrimination means for discriminating the size of the sheet on which recording is to occur specified in the input data;

means for inputting a printing restart instruction; and means for instructing only the size discrimination means to discriminate the size of the sheet on which recording is to occur after the printing restart instruction is input.

6. A recording apparatus according to claim 5, further comprising:

a third memory for storing data representing the size of the sheet specified by the input data; and a detector for detecting the size of the sheet set in said apparatus, and wherein said informing means informs an operator of an inconsistency between the data stored in said third memory and size of the sheet detected by said detector.

7. A recording apparatus according to claim 6, further comprising:

input means for inputting the input data, wherein the input data includes a command sent from an external device; and a printing mechanism for printing an image in accordance with the input data.

8. A recording apparatus according to claim 7, wherein said printing mechanism comprises first and second sheet feeding mechanisms, and wherein said recording apparatus further comprises changing means for changing the sheet feeding mechanism which feeds a sheet to said printing mechanism when the data stored in said first and the second memories are inconsistent.

9. A recording apparatus comprising:

input means for inputting image data specifying an image to be printed sent from an external device;

a printing mechanism for printing the image specified in the image data, said printing mechanism including a common paper feed means for different kinds of sheets;

a first memory for storing size data relating to the size of the sheets;

control means for controlling said apparatus; and a console, connected to said control means, configured to manually input data designating the kind of sheet on which the image data is to be printed, wherein said input means is capable of inputting kind designating command data from the external device for designating a kind of sheet on which printing is to occur, so that the external device can designate the kind of sheet on which the image data is to be printed, and wherein said control means compares the data input via said console and via the external device and controls said apparatus on the basis of the comparison and the size data stored in said first memory.

10. A recording apparatus according to claim 9, further comprising:

a second memory for storing kind data representing the kind of sheet set in said apparatus; and a detector for detecting the size of the sheet set in said apparatus, wherein said control means controls said apparatus based on the input kind designating command data, the size of the sheet detected by said detector, the size data stored in said first memory, and the kind data stored in said second memory and the output from said detector.

11. A recording apparatus according to claim 10, wherein when the designated kind of sheet is different from the kind of the sheet represented by the kind data stored in the second memory, said apparatus informs the external device that the designated kind of sheet is different from the kind of sheet represented by the kind data stored in the second memory and is in a standby state.

12. A recording apparatus according to claim 9, wherein said input means is capable of inputting kind designating command data for designating a transparent sheet as the kind of sheet on which printing is to occur.

13. A recording apparatus comprising:

input means for inputting image data specifying an image to be printed sent from an external device;

a printing mechanism for printing the image specified in the image data, said printing mechanism including a common paper feed means for different kinds of sheets;

a size detector for detecting the size of the sheet set in said apparatus;

control means for controlling said apparatus; and a console, connected to said control means, configured to manually input data designating the kind of sheet on which the image data is to be printed, wherein said input means is capable of inputting kind designating command data from the external device for designating a kind of sheet on which printing is to occur, so that the external device can designate the kind of sheet on which the image data is to be printed, and wherein said control means compares the data input via said console and via the external device and controls said apparatus on the basis of the comparison and the size of the sheet detected by said size detector.

14. A recording apparatus according to claim 13, further comprising a memory for storing kind data representing the kind of sheet set in said apparatus, wherein said input means comprises input size designating command data means for inputting size designating command data from the external device for designating a size of a sheet on which printing is to occur, wherein said control means controls said apparatus based on the input kind designating command data, the input size designating command data, the size of the sheet detected by said detector, and the kind data stored in said memory.

15. A recording apparatus according to claim 14, wherein when the designated kind of sheet is different from the kind of the sheet represented by the kind data stored in the memory, said apparatus informs an external device that the designated kind of sheet is different from the kind of sheet represented by the kind data stored in the memory and is in a standby state.

16. A recording apparatus according to claim 13, wherein said console is capable of inputting kind designating command data for designating a transparent sheet as the kind of sheet on which printing is to occur.

17. A printer control apparatus for controlling a printer with a common sheet feeding means for different kinds of sheets, comprising:

input means for inputting print data sent from an external host device, wherein said input means is capable of inputting kind designating command data designating the kind of sheets on which printing is to occur, so that the external device can designate the kind of sheet on which the image data is to be printed;

a first memory for storing kind data designated by the kind designating command data input from said input means;

processing means for analyzing the input data for controlling the printer; and a console, connected to said processing means, configured to manually input data designating the kind of sheet on which the image data is to be printed, wherein said processing means compares the data input via the external device and said console.

18. A printer control apparatus according to claim 17, said apparatus further comprising:

size data input means for inputting size data output from the printer and for representing the size of a sheet set in the printer.

19. A printer control apparatus according to claim 18, wherein said input means is capable of inputting size designating command data for designating the size of the sheets on which printing is to occur, wherein said apparatus further comprises a third memory for storing size data designated by the size designating command data input from said input means.

20. A printer control apparatus according to claim 19, wherein said processing means performs different processes in accordance with the result of comparing the size data stored in said third memory and the size data input by said size data input means.

21. A printer control apparatus according to claim 20, wherein said processing means causes the printer to perform a printing operation by outputting the printing data to the printer when the compared size data correspond to each other, and wherein said processing means causes the printer to be set in a standby state when the compared size data do not correspond to each other.

22. A printer control apparatus according to claim 17, said apparatus further comprising:

a second memory for storing kind data representing the kind of sheet input via said console.

23. A printer control apparatus according to claim 22, wherein said processing means performs different processes in accordance with the result of comparing the kind data stored in said first memory and the kind data stored in said second memory.

24. A printer control apparatus according to claim 23, wherein said processing means, when both kind data corresponds to each other, causes the printer to perform a printing operation by outputting the printing data to the printer, and when both kind data do not correspond to each other, causes the printer to be set in a standby state.

25. An apparatus according to claim 17, further comprising the printer.

26. An apparatus according to claim 25, wherein said printer comprises a feeding mechanism for feeding the sheet set in the printer.

27. A printer control apparatus for controlling a printer with a common sheet feeding means for feeding different sizes of sheets comprising:

input means for inputting print data set from an external host apparatus, wherein said input means is capable of inputting size designating command data designating the size of sheets on which printing is to occur, so that the external device can designate the size of sheet on which image data is to be printed;

a first memory for storing size data designated by the size designating command data input from said input means;

processing means for analyzing the input data for controlling the printer;

size discrimination means for discriminating the size of the sheet on which image data is to be printed;

a console, connected to said processing means, configured to manually input a printing restart instruction and comprising a display for displaying a message requesting the operator to change the sheet on which image data is to be printed, wherein said processing means compares the data input via the external device and said size discriminating means, wherein when said processing means determines from the data input via the external device and from the size discriminating means that the size of the sheet set in the printer is different than the size of the sheet specified by the data input via the external device, a message is displayed on the display of said console, requesting the operator to change the sheet, wherein said processing means actuates the printer in response to a print restart instruction input by said console manually by the operator.

28. A printer control apparatus according to claim 29, wherein via said console, data designating the kind of a sheet, on which the image data is to be printed, can be input.

29. A printer control apparatus according to claim 28, wherein said input means is capable of inputting kind designating command data for designating the kind of the sheets on which printing is to occur, wherein said apparatus further comprises a third memory for storing kind data designated by the kind designating command data input from said input means, and a fourth memory for storing kind data designated by the data input via said console.

30. A printer control apparatus according to claim 29, wherein said processing means performs different processes in accordance with the result of comparing the kind data stored in said third memory and the kind data stored in said fourth memory.

31. A printer control apparatus according to claim 30, wherein said processing means causes the printer to perform a printing operation by outputting the print data onto a sheet when the compared kind data correspond to each other, and wherein said processing means causes the printer to be set in a standby state when the compared size data do not correspond to each other.

32. A printer control apparatus according to claim 27, said apparatus further comprising:

a second memory for storing size data representing the size of a sheet on which image data is to be printed.

33. A printer control apparatus according to claim 32, wherein said processing means performs different processes in accordance with the result of comparing the size data stored in said first memory and the size data stored in said second memory.

34. A printer control apparatus according to claim 33, wherein said processing means, when both size data corresponds to each other, causes the printer to perform a printing operation by outputting the print data onto a sheet, and when both size data do not correspond to each other, causes the printer to be set in a standby state.

35. An apparatus according to claim 27, further comprising the printer.

36. An apparatus according to claim 35, wherein said printer comprises a feeding mechanism for feeding the sheet set in the printer.

37. A printer control apparatus for controlling a printer, which prints an image on a sheet set in the printer, comprising:

input means for inputting designating data relating to a sheet on which an image is to be printed;

a console configured to manually input data relating to a sheet set in the printer and a printing restart instruction, said console comprising a display for displaying a message; and comparing means for comparing the designating data input by said input means and the data manually input from said console, prior to a printing operation, wherein when said comparing means determines that the designating data input by said input means and the data manually input from said console do not correspond to each other, a message representing the comparison result is displayed on the display of said console without starting the printing operation; and wherein said apparatus actuates the printer in response to the printing restart instruction input by said console manually by the operator.

38. A printer control apparatus according to claim 37, wherein the designating data is a command for designating the kind of a sheet, on which the image is to be printed.

39. An apparatus according to claim 37, further comprising the printer.

40. An apparatus according to claim 39, wherein said printer comprises a feeding mechanism for feeding the sheet set in said printer.

41. An apparatus according to claim 39, wherein said printer prints an image on a sheet using an electrophotographic technology.

42. An apparatus according to claim 37, wherein said input means inputs print data sent from an external device.

43. An apparatus according to claim 37, wherein the printing restart instruction is input after the operator changes a sheet to be set in the printer, in order to start a printing operation.

44. A method for controlling a printer, which prints an image on a sheet set in the printer, comprising steps of:

storing manually input data relating to the sheet set in the printer from a console;

storing designating data sent from an external apparatus relating to a sheet on which an image is to be printed;

comparing the designating data sent from the external apparatus and the data manually input from said console, prior to a printing operation;

displaying, on the console, a message representing the comparison in said comparing step without starting a printing operation, when it is determined that the designating data sent from the external apparatus and the data manually input from said console do not correspond to each other in said comparing step; and actuating the printer in response to a print restart instruction manually input from said console, when it is determined that the designating data sent from the external apparatus and the data manually input from said console do not correspond to each other in said comparing step.

45. A printer control apparatus according to claim 44, wherein the designating data is a command for designating the kind of a sheet on which the image is to be printed.

46. An apparatus according to claim 44, further comprising the step of inputting the print restart instruction after the operator changes the sheet set in the printer, in order to start a printing operation.

* * * * *

UNITED STATES PATENT AND TRADEMARK OFFICE
CERTIFICATE OF CORRECTION

PATENT NO. : 5,459,580
DATED : October 17, 1995
INVENTOR(S) : YASUHITO SUZUKI

It is certified that error appears in the above-indentified patent and that said Letters Patent is hereby corrected as shown below:

SHEET 4

FIGURE 4, STEP 23, "THE ALL" should read --ALL THE--.

COLUMN 2

Line 3, "the sheet" should read --of sheet--;
    Line 8, "sheets" should read --of sheets--; and
    Line 63, "EMBODIMENT" should read --EMBODIMENTS--.

COLUMN 3

Line 41, "and the" should read --and--.

COLUMN 5

Line 17, "indicting" should read --indicating--.

COLUMN 8

Line 59, "the second" should read --said second--.

COLUMN 9

Line 25, close up right margin;
    Line 31, "the second" should read --said second--; and
    Line 34, "the second" should read --said second.

UNITED STATES PATENT AND TRADEMARK OFFICE
CERTIFICATE OF CORRECTION

PATENT NO. : 5,459,580

DATED : October 17, 1995

INVENTOR(S) : YASUHITO SUZUKI

It is certified that error appears in the above-indentified patent and that said Letters Patent is hereby corrected as shown below:

COLUMN 11

Line  8, "sponds" should read --spond--;
    Line 16, "the" should read --said--;
    Line 39, "discriminating" should read
             --discrimination--;
    Line 42, "the size discriminating" should read --said
             size discrimination--; and
    Line 50, "claim 29," should read --claim 27,--.

COLUMN 12

Line  6, "size" should read --kind--;
    Line 19, "sponds" should read --spond--;
    Line 27, "the" should read --said--; and
    Line 65, "the printer" should read --said printer--.

Signed and Sealed this

Twenty-third Day of April, 1996

Attest:

BRUCE LEHMAN

Attesting Officer

Commissioner of Patents and Trademarks